(12) United States Patent
O'Sullivan et al.

(10) Patent No.: US 7,110,381 B1
(45) Date of Patent: Sep. 19, 2006

(54) DIVERSITY TRANSCEIVER FOR A WIRELESS LOCAL AREA NETWORK

(75) Inventors: John O'Sullivan, Ermington (AU); Neil Weste, Castle Hill (AU)

(73) Assignee: Cisco Systems Wireless Networking (Australia) Pty Limited, North Sydney (AU)

( * ) Notice: Subject to any disclaimer, the term of this patent is extended or adjusted under 35 U.S.C. 154(b) by 989 days.

(21) Appl. No.: 09/953,461

(22) Filed: Sep. 14, 2001

Related U.S. Application Data

(60) Provisional application No. 60/277,370, filed on Mar. 19, 2001, provisional application No. 60/283,609, filed on Apr. 13, 2001.

(51) Int. Cl.
*H04L 12/50* (2006.01)

(52) U.S. Cl. .................................................. 370/338

(58) Field of Classification Search ........ 370/328–339, 370/464, 465; 375/267, 347; 455/101–103
See application file for complete search history.

(56) References Cited

U.S. PATENT DOCUMENTS

| | | | | |
|---|---|---|---|---|
| 5,487,069 A * | 1/1996 | O'Sullivan et al. | ......... | 370/404 |
| 5,694,417 A * | 12/1997 | Andren et al. | ............. | 375/150 |
| 5,712,870 A * | 1/1998 | Petrick | ....................... | 375/147 |
| 5,917,872 A | 6/1999 | Ching | ....................... | 375/369 |
| 5,923,761 A | 7/1999 | Lodenius | ..................... | 380/49 |
| 5,949,793 A | 9/1999 | Bossard et al. | ............. | 370/487 |
| 5,953,636 A | 9/1999 | Keate et al. | .................. | 455/3.2 |
| 6,018,651 A * | 1/2000 | Bruckert et al. | ......... | 455/277.1 |
| 6,100,767 A | 8/2000 | Sumi | ........................... | 331/11 |
| 6,229,486 B1 * | 5/2001 | Krile | ................... | 343/700 MS |
| 6,317,411 B1 * | 11/2001 | Whinnett et al. | ........... | 370/204 |
| 6,351,499 B1 * | 2/2002 | Paulraj et al. | ............. | 375/267 |
| 6,377,782 B1 * | 4/2002 | Bishop et al. | ............. | 455/3.01 |
| 6,477,210 B1 * | 11/2002 | Chuang et al. | ............. | 375/340 |
| 6,526,264 B1 * | 2/2003 | Sugar et al. | .................. | 455/84 |
| 6,661,999 B1 * | 12/2003 | Johnson et al. | ......... | 455/127.1 |
| 6,870,808 B1 * | 3/2005 | Liu et al. | ..................... | 370/203 |

OTHER PUBLICATIONS

Foschini et al, On Limits of Wireless Communications in a Fading Environment when Using Multiple Antennas, Kluwer Academic Publisher, pp. 311-335, 1998.*
J. C. Rudell, J.J. Ou, R. S. Narayanaswami, G. Chien, J. A. Weldon, L. Lin, K.C. Tsai, L. Tee, K. Khoo, D. Au, T. Robinson, D. Gerna, M. Otsuka, P. R. Gray. "Recent Developments in High Integration Multi-Standard CMOS Transceivers for Personal Communication Systems." *Proceedings of the 1998 International Symposium on Low Power Electronics and Design.* Aug. 10-12, 1998, 1998, Monterey, California, United States.

* cited by examiner

*Primary Examiner*—Frank Duong
(74) *Attorney, Agent, or Firm*—Dov Rosenfeld Inventek

(57) ABSTRACT

A wireless local area network system comprises a 5.0+ GHz radio transceiver with two receiving antennas and one transmitting antenna. A transmitter power amplifier output is connected to the transmitting antenna through a 6–8 pole filter to control spurious signal output. Each receiving antenna is fitted with its own low-noise amplifier followed by a simple bandpass filter. Each bandpass filter feeds a diversity switch with a single output to a single receiver. The radio system constitutes a physical-layer (PHY) part of a wireless local-area network.

18 Claims, 3 Drawing Sheets

DIVERSITY TRANSCEIVER FOR A WIRELESS LOCAL AREA NETWORK

RELATED PATENT APPLICATIONS

This Application claims priority of U.S. provisional patent applications, Ser. No. 60/277,370 entitled SYSTEM USING SINGLE CHIP WIRELESS LAN MODEM AND SINGLE CHIP RADIO TRANSCEIVER AND APPARATI, METHODS, AND SOFTWARE PRODUCTS USED THEREIN OR THEREWITH, filed Mar. 19, 2001; and also, Ser. No. 60/283,609 entitled WIRELESS COMMUNICATION SYSTEM, filed Apr. 13, 2001. Both are incorporated herein by reference.

BACKGROUND OF THE INVENTION

1. Field of the Invention

The present invention relates to radio transceivers, and more particularly to combinations of receiving antennas and transmitting antennas that reduce signal losses that occur before the first low-noise amplification or after the last power amplification stage.

2. Description of Related Art

Radio transceivers that share one antenna between the receiver and transmitter generally rely on a transmit/receive (T/R) switch to multiplex the antenna. This, of course presupposes half-duplex operation where only the receiver or transmitter is being used at any one time.

Many radio receiver applications are such that they must reliably receive and demodulate very weak signals. The radio field signal strength can drop so low in some applications that special low-noise amplifier (LNA) modules are integrated with the antenna assembly. A typical such application is the microwave patch antennas used in global positioning system (GPS) navigation receivers. Of course, GPS receivers do not have the complication of an included transmitter or T/R switch. Similarly, losses between the power amplification and the antennas due to diversity and T/R switches limits the available transmitted power and impacts on the transmission reliability.

Antenna diversity is used in some modern systems to take advantage of the fact that even closely positioned antennas can experience very different induced signal levels. This often requires a "diversity switch" that can be controlled to select one antenna over the other.

In radio transceiver systems that operate in the 5.0+ GHz spectrum, e.g., radio transceivers that conform to the IEEE 802.11 standard, a typical T/R switch and diversity switch can each insert approximately 1.5 dB of signal loss. At the field strengths that wireless local area networks operate in, their receivers can ill-afford such losses because they come before the earliest point an LNA can be placed. Another approximately 2.0 dB of loss is typically introduced when relatively complex bandpass filters, e.g., bandpass filters with 3 or more poles are added between the antenna diversity switch and T/R switch to eliminate spurious sidebands from the transmitted signal. Such a filter sits in the received signal path too. Altogether, such losses in conventional designs can add up to approximately 5.0 dB for each of the transmitter and receiver to the antenna.

Local area networks (LAN's) are conventionally interconnected by twisted-wire pairs and shielded cables. A whole class of mobile computing has emerged that depends on various kinds of wireless communication. Amateur radios and cellphones have long been used to connect computer browsers to the Internet, and now wireless devices have been used to build LAN's within a room or building. Better frequency bands and higher allowable power will allow LAN clients to roam around in cities and along highways.

An industry-standard, the IEEE 802.11 specification, defines the protocol for two types of networks, ad-hoc and client/server networks. An ad-hoc network is a simple network where communications are established between multiple stations in a given coverage area without the use of an access point or server. The standard specifies the etiquette that each station must observe so that they all have fair access to the wireless media. It provides methods for arbitrating requests to use the media to ensure that throughput is maximized for all of the users in the base service set. The client/server network uses an access point that controls the allocation of transmit time for all stations and allows mobile stations to roam from cell to cell. The access point is used to handle traffic from the mobile radio to the wired or wireless backbone of the client/server network. This arrangement allows for point coordination of all of the stations in the basic service area and ensures proper handling of the data traffic. The access point routes data between the stations and other wireless stations or to and from the network server. Typically wireless local area networks (WLAN's) controlled by a central access point will provide better throughput performance.

The license-free national information structure (U-NII) radio spectrum bands in the United States are assigned to 5.15–5.25, 5.25–5.35, and 5.725–5.825 GHz, and are ideal for wireless ad-hoc LAN communication use. The IEEE-802.11a protocol prescribes using a training sequence comprising a preamble that enables a receiver to lock on to the carrier and helps get the data demodulation going.

The IEEE-802.11a burst transmission begins with a two-part preamble, e.g., a short preamble and a long-preamble. The exact boundary point between the short and long preambles is important to the receiver's subsequent demodulation process, and must be found quickly in an environment where the carrier frequency and code phase are uncertain. Signal fading, multipath interference, and channel distortion can make signal acquisition less certain in a typical receiver.

SUMMARY OF THE INVENTION

An object of the present invention is to provide a wireless local area network.

Another object of the present invention is to improve radio reception in a wireless local area network.

A further object of the present invention is to provide a more reliable radio transceiver.

Briefly, a transceiver embodiment of the present invention for operating in a wireless local area network comprises a 5.0+ GHz radio transceiver with reduced losses comprised of two receiving antennas and one transmitting antenna or one receiving antenna and two transmit antennas. A transmitter power amplifier output is connected to the transmitting antenna through a bandpass filter to control spurious signal output. Each receiving antenna is fitted with its own low-noise amplifier followed by a simple bandpass filter. Each bandpass filter feeds a diversity switch with a single output to a single receiver. The radio transceiver constitutes a physical-layer (PHY) part of a wireless local-area network.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
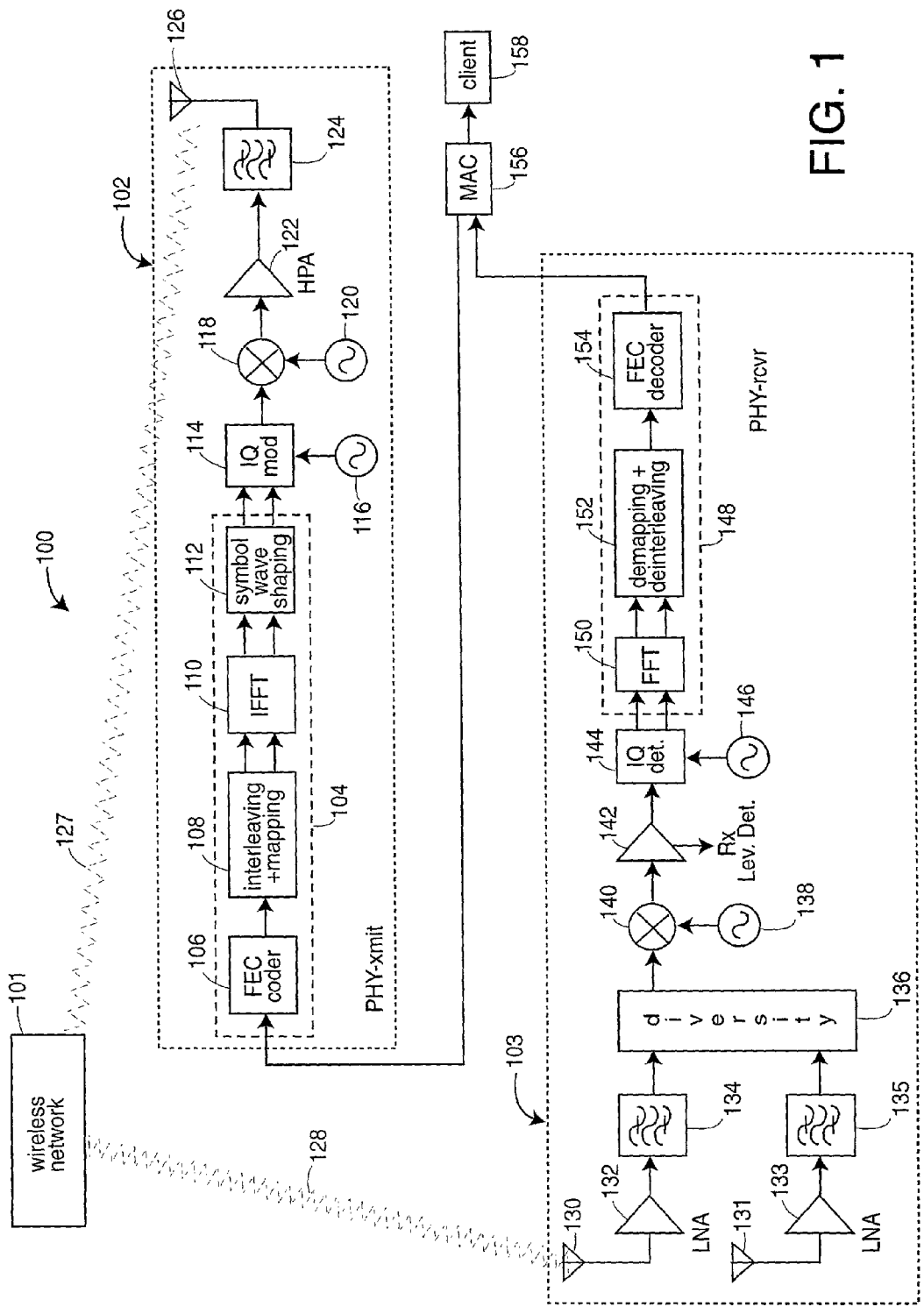
FIG. 1 is a functional block diagram of a first wireless local area network system embodiment of the present invention in which there are two receiving antennas connected to a diversity switch.

FIG. 1 illustrates a wireless local area network (LAN) system embodiment of the present invention, and referred to herein by the general reference numeral 100. Such is preferably based on orthogonal frequency division multiplexing (OFDM), and quadrature phase shift keying (QPSK) and quadrature amplitude modulation (QAM) of signals transmitted in the 5 GHz frequency spectrum. The wireless LAN system 100 includes a wireless network 101 that may be connected to the Internet, a PHY-transmitter 102, and a PHY-receiver 103. Such all preferably conform to the IEEE-802.11a Specification for a physical layer (PHY) interface in a wireless local area network which allows mobile clients on an ad-hoc basis.

In a typical embodiment, the transmitter 102 comprises a one or more digital signal processing elements (DSP) 104 which implement a forward error correction (FEC) coder 106, an interleaving and mapping process 108, an inverse fast Fourier transform processor 110, and a symbol wave shaper 112. The DSP 104 outputs in-phase (I) and quadrature-phase (Q) signals that are input to an IQ modulator 114 driven by a local oscillator 116. The modulated output is sent to a mixer 118 for up-conversion to the 5 GHz band. A second local oscillator 120 provides the necessary carrier frequency. A high power amplifier (HPA) 122 has any spurious sidebands removed by a bandpass filter 124 before being output to a transmitter antenna 126. Such filter 124 is necessarily a complex type, e.g., a multi-pole filter that in one embodiment has as few as 2–3 poles, and in another has 6–8 poles. A radio up-link 127 is received by the wireless network 101, and communicates Internet traffic, for example. In general, the transmitter 102 can be implemented with conventional methods and components. One embodiment is a transmitter part of a transceiver integrated circuit implemented in CMOS, with one or more external components, e.g., the complex bandpass filter.

Conventional practice puts diversity and transmit switching before a single LNA. By ensuring that the transmit antenna to receive antenna isolation is better than, for example, 30 dB and that the LNA power handling limit is better than about −10 dBm, then transmit power levels of about 10 dBm can be handled with the present invention. The advantage is the elimination of these switching losses.

In alternative transmitter embodiments of the present invention, two power amplifiers are used with a single diversity switch in front of the amplifiers. Thus the diversity switch losses do not detract from the achievable power output. Only one such power amplifier has its power switched on before transmission, to save overall power consumption. This is best done using a gradual, i.e., modulated switch-on, e.g., using a ramp function as described in co-pending U.S. patent application Ser. No. 09/877,398 to Adams, et al., filed Jun. 8, 2001, and assigned to the assignee of the present invention.

The receiver 103 receives a radio down-link 128 that is typically transmitted in bursts. Each burst is begun with a training sequence, e.g., a short and long preamble. In one embodiment, the receiver 103 includes at least two receiver antennas 130 and 131 each followed by a low-noise amplifier (LNA) 132 and 133. The antennas are preferably separated by at least one-half wavelength.

A pair of bandpass filters 134 and 135 precede a diversity switch 136. These are typically not the more complex 6–8 pole types needed by the transmitter. Insertion losses in filters 134 and 135 range 0.5–0.6 dB, and insertion loss through the diversity switch 136 is about 1.5 dB. Critically, both these losses occur after LNA 132 and 133.

In latter stages of the receiver 103, measurements are made on the received signals to decide whether diversity switch 136 should select signals from antenna 130 or antenna 131. The physical diversity of the two antennas will often cause one to have a better quality view of radio down-link 128.

In situations with significant multipath in the transmission path from transmitter to receiver, two antennas separated by as little as one half wavelength at one end or the other will suffer different amounts of signal fading. For Rayleigh faded signals corresponding to a large number of multiple paths, this means that 3 dB or more average improvement may typically be achieved by selecting the best antenna on transmit or, in the case of receive diversity, best antenna on receive, or, in the case of transmit and receive diversity, the best antenna on both.

A local oscillator 138 and a first mixer 140 produce an intermediate frequency (IF). An automatic gain control (AGC) amplifier 142 smoothes out signal-strength variations and drives an IQ-detector 144. A second local oscillator 146 provides the carrier necessary to derive the I and Q samples. Automatic frequency control (AFC) clock recovery can be skipped if frequency offset errors are corrected in later digital processing. One or more receiver signal processing elements (receiver-DSP 148) implement a fast Fourier transform process 150, a demapping and deinterleaving process 152, and an FEC decoder 154. The receiver-DSP 148 further includes the necessary digital logic needed for carrier frequency offset determination and correction. The higher levels of a mobile, computer-network client are represented by a media access controller (MAC) 156 and a client agent software 158.

Figure 2:
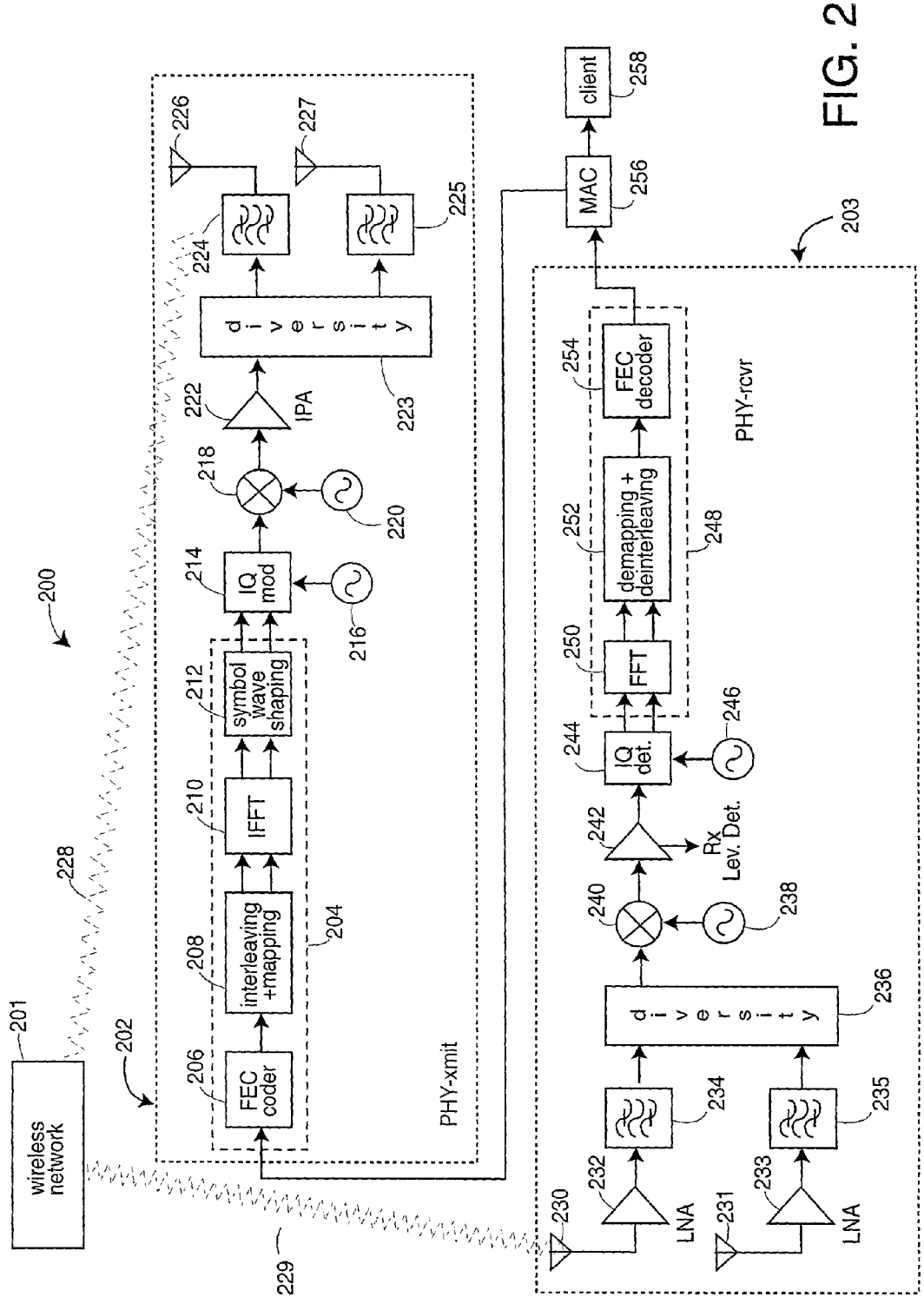
FIG. 2 is a functional block diagram of a second wireless local area network system embodiment of the present invention in which the transmitter is connected to two antennas through a diversity switch.

FIG. 2 illustrates another wireless local area network (LAN) system embodiment of the present invention, and is referred to herein by the general reference numeral 200. Such is also based on orthogonal frequency division multiplexing (OFDM), and modulation of signals, e.g., quadrature phase shift keying (QPSK) of signals transmitted in the 5 GHz frequency spectrum. As in system 100, the wireless LAN system 200 includes a wireless computer-data network 201 that may be connected to the Internet, a PHY-transmitter 202 with antenna diversity, and a PHY-receiver 203.

In a typical embodiment, the transmitter 202 comprises a digital signal processor (DSP) 204 which implements a forward error correction (FEC) coder 206, an interleaving and mapping process 208, an inverse fast Fourier transform processor 210, and a symbol wave shaper 212. The DSP 204 outputs in-phase (I) and quadrature-phase (Q) signals that are input to an IQ modulator 214 driven by a local oscillator 216. The modulated output is sent to a mixer 218 for up-conversion to the 5 GHz band. A second local oscillator 220 provides the necessary carrier frequency.

A high power amplifier (HPA) 222 is connected through an antenna-diversity switch 223. Such allows a test transmission to be made using one transmitter antenna, and if no remote response is elicited from the transmission, then a switch is made to transmit from another antenna. The assumption is that the slight difference in diversity may be enough to get the transmitted signal to the intended receivers.

The two outputs of the diversity switch 223 have any spurious sidebands removed by a filter 224 or 225 before being output to a corresponding transmitter antenna 226 or 227. Such filter 224 is necessarily a relatively complex type, e.g., a multi-pole one with as few as 2–3 and as many as 6–8, or even more poles. A radio up-link 228 is received by the wireless network 201, and communicates Internet traffic, for example.

The receiver 203 receives a radio down-link 229 that is typically transmitted in bursts. The receiver 203 includes at least two receiver antennas 230 and 231 each followed by a low-noise amplifier (LNA) 232 and 233. A pair of bandpass filters 234 and 235 precede a diversity switch 236. These are typically not the relatively complex multi-pole types needed by the transmitter. Insertion losses in filters 234 and 235 range 0.5–0.6 dB, and insertion loss through the diversity switch 236 is about 1.5 dB. Critically, both these losses occur after LNA 232 or 233.

Alternatively, receiver 203 uses only a single antenna 230, a single LNA 232, a single bandpass filter 234, and no diversity switch. The transmitter antenna diversity is relied on more heavily in such situation.

In latter stages of the receiver 203, measurements are made on the received signals to decide whether diversity switch 236 should select signals from antenna 230 or antenna 231. The physical diversity of the two antennas will often cause one to have a better quality view of radio down-link 229.

A local oscillator 238 and a first mixer 240 produce an intermediate frequency (IF). An automatic gain control (AGC) amplifier 242 smoothes out signal-strength variations and drives an IQ-detector 244. A second local oscillator 246 provides the carrier necessary to derive the I and Q samples. Automatic frequency control (AFC) clock recovery can be skipped if frequency offset errors are corrected in later digital processing. A receiver-DSP 248 comprises a fast Fourier transform process 250, a demapping and deinterleaving process 252, and an FEC decoder 254. The receiver-DSP 248 further includes the necessary digital logic needed for carrier frequency offset determination and correction.

The higher levels of a mobile, computer-network client are represented by a media access controller (MAC) 256 and a client agent software 258.

Figure 3:
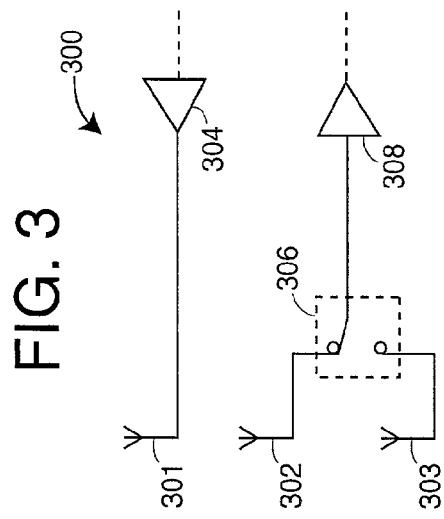
FIG. 3 is a schematic diagram of a receiver antenna diversity arrangement that requires no T/R switch in an alternative embodiment of the present invention.

FIG. 3 represents a receiver antenna diversity arrangement 300 that requires no T/R switch in an alternative embodiment of the present invention. A set of three antennas 301–303 are physically diversified. Antenna 301 is a transmit antenna driven by a power amplifier 304. Antennas 302 and 303 are receive antennas that are multiplexed through by a receive-diversity switch 306 to a low-noise amplifier (LNA) 308.

Figure 4:
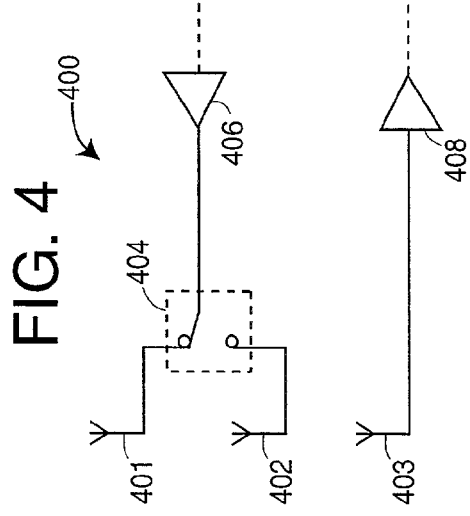
FIG. 4 is a schematic diagram of a transmitter antenna diversity arrangement that requires no T/R switch in another alternative embodiment of the present invention.

FIG. 4 represents a transmitter antenna diversity arrangement 400 that requires no T/R switch in another alternative embodiment of the present invention. A set of three antennas 401–403 include two receive antennas 401 and 402 connected to a transmit-diversity switch 404. A power amplifier 406 is selectively connected to antennas 401 and 402. A low-noise amplifier (LNA) 408 receives its signals from antenna 403.

Figure 5:
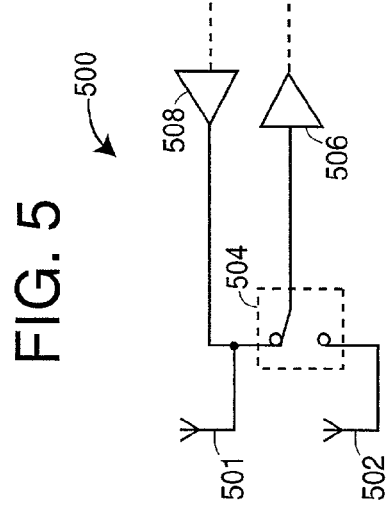
FIG. 5 is a schematic diagram of a receive-antenna diversity arrangement that requires no T/R switch and uses only two antennas in an alternative embodiment of the present invention.

FIG. 5 represents a receive-antenna diversity arrangement 500 that requires no T/R switch and uses only two antennas 501 and 502 in an alternative embodiment of the present invention. A receive-diversity switch 504 multiplexes the two antennas to a low-noise amplifier (LNA) 506. A power amplifier 508 drives only antenna 501.

Figure 6:
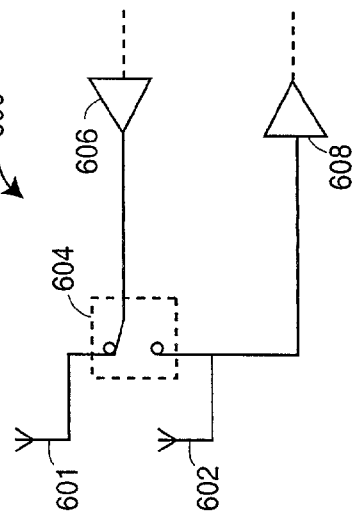
FIG. 6 is a schematic diagram of a transmit-antenna diversity arrangement that requires no T/R switch and uses only two antennas in another alternative embodiment of the present invention.

FIG. 6 represents a transmit-antenna diversity arrangement 600 that also requires no T/R switch. It uses only two antennas 601 and 602 in another alternative embodiment of the present invention. A transmit-diversity switch 604 multiplexes the two antennas to a power amplifier 606. The antenna 602 alone is connected to a low-noise amplifier (LNA) 608.

The antenna diversity described herein may be applied in a transceiver at the receiver, at the transmitter, or both.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A network node for operating in a wireless computer-data network that operates according to an IEEE 802.11 standard, that includes a local network client, and that operates according to an IEEE 802.11 PHY standard, the network node comprising:

a physical-layer (PHY) radio receiver for supporting communications from the wireless computer-data network to said local network client, the radio receiver configured for operation using OFDM according to an IEEE 802.11 OFDM PHY standard and including one or more local oscillators, a first downconverter coupled to one of the local oscillators and configured in operation to convert a received signal to an intermediate frequency signal, a filter to filter the intermediate frequency signal to produce a filtered intermediate frequency signal, a second downconverter coupled to one of the local oscillators and configured in operation to convert the filtered intermediate frequency signal to form a signal for digitizing, an analog to digital converter to digitize the signal for digitizing, and a digital processor to process the digitized signal output by the analog to digital converter, the digital processor including a processor implementing a discrete Fourier transform operation, and further including a programmable processor; and at least two receiver antennas connected through a diversity switch to the PHY radio receiver and providing for alternative diversity reception points that are selectable according to a switch signal determined by the digital processor according to radio signal quality, the diversity switch having a signal path for the switch signal from the digital processor of the PHY radio receiver.

2. A network node as recited in claim 1, wherein the PHY radio receiver is substantially integrated as a single analog chip and a single digital chip.

3. A network node for operating in a wireless computer-data network that operates according to an IEEE 802.11 standard, that includes a local network client, and that operates according to an IEEE 802.11 PHY standard, the network node comprising:

a physical-layer (PHY) radio transmitter for supporting communications from said local network client to the wireless computer-data network, the radio transmitter configured for operation using OFDM according to the IEEE 802.11 OFDM PHY standard and including a digital processor to generate a digital OFDM signal for transmitting, the digital processor including a processor implementing an inverse Fourier transform operation, one or more local oscillators, a digital-to-analog converter coupled to the digital processor to convert the digital OFDM signal for transmitting to an analog signal, a first upconverter coupled to one of the local oscillators and configured in operation to convert the analog signal to an intermediate frequency signal, a filter to filter the intermediate frequency signal to produce a filtered intermediate frequency signal, and a second upconverter coupled to one of the local oscillators and configured in operation to convert the filtered intermediate frequency signal to form a radiofrequency signal, the digital processor further including a programmable processor; and at least two transmitter antennas connected through a diversity switch to the PHY radio transmitter and providing for alternative diversity transmission points that are selectable according to a switch signal determined by the digital processor according to network responses, the diversity switch having a signal path for the switch signal from the digital processor of the PHY radio transmitter.

4. A network node as recited in claim 3, wherein the PHY radio transmitter is substantially integrated as a single analog chip and a single digital chip.

5. A network node for operating in a wireless computer-data network that operates according to an IEEE 802.11 standard, that includes a local network client, and that operates according to an IEEE 802.11 PHY standard, the network node comprising:

a physical-layer (PHY) radio transmitter for supporting communications from said local network client to the wireless computer-data network, the radio transmitter configured for operation using OFDM according to the IEEE 802.11 OFDM PHY standard and including a digital processor to generate a digital OFDM signal for transmitting, the digital processor including a processor implementing an inverse Fourier transform operation, one or more local oscillators, a digital-to-analog converter coupled to the digital processor to convert the digital OFDM signal for transmitting to an analog signal, a first upconverter coupled to one of the local oscillators and configured in operation to convert the analog signal to an intermediate frequency signal, a filter to filter the intermediate frequency signal to produce a filtered intermediate frequency signal, and a second upconverter coupled to one of the local oscillators and configured in operation to convert the filtered intermediate frequency signal to form a radiofrequency signal;

a physical-layer (PHY) radio receiver for supporting communications from the wireless computer-data network to said local network client, the radio receiver configured for operation using OFDM according to an IEEE 802.11 OFDM PHY standard and including a first downconverter coupled to one of the local oscillators and configured in operation to convert a received signal to an intermediate frequency received signal, a filter to filter the intermediate frequency signal to produce a filtered intermediate frequency received signal, and a second downconverter coupled to one of the local oscillators and configured in operation to convert the filtered intermediate frequency received signal to form a received signal for digitizing, an analog to digital converter to digitize the received signal for digitizing and to provide the digitized received signal to the digital processor for processing, the digital processor including a processor implementing a discrete Fourier transform operation, and further including a programmable processor;

at least two receiver antennas connected through a diversity switch to the PHY radio receiver and providing for alternative diversity reception points that are selectable according to a receive switch signal determined by the digital processor according to received radio signal quality, the diversity switch having a signal path for the receive switch signal from the digital processor of the PHY radio receiver; and at least two transmitter antennas connected through a diversity switch to the PHY radio transmitter and providing for alternative diversity transmission points that are selectable according to a transmit switch signal determined by the digital processor according to network responses, the diversity switch having a signal path for the transmit switch signal from the digital processor of the PHY radio transceiver.

6. A network node as recited in claim 5, wherein the PHY radio transmitter and PHY radio receiver are substantially integrated together as a single analog transceiver chip and a single digital transceiver chip.

7. A physical-layer (PHY) radio receiver for supporting wireless local area network (WLAN) communications according to an IEEE 802.11 PHY standard, the PHY radio receiver comprising:

at least two receiver antennas connected through a diversity switch to a radio receiver and providing for selectable diversity reception points;

a low-noise amplifier (LNA) integrated with each of the receiver antennas;

one or more local oscillators;

a first downconverter coupled to one of the local oscillators and configured in operation to convert a received signal to an intermediate frequency signal;

a filter to filter the intermediate frequency signal to produce a filtered intermediate frequency signal;

a second downconverter coupled to one of the local oscillators and configured in operation to convert the filtered intermediate frequency signal to form a signal for digitizing;

an analog to digital converter coupled to the second downconverter and configured in operation to digitize the signal for digitizing; and a digital processor to process the digitized signal output by the analog to digital converter, the digital processor including a processor implementing a discrete Fourier transform operation, the digital processor further including a programmable processor;

wherein the diversity switch follows each antenna and corresponding LNA and provides diversity selection between wireless local area network (WLAN) signals received by the antennas, the diversity switch having a switch signal input and a signal between the switch signal input and the digital processor, wherein the PHY radio receiver is configured for operation using OFDM according to an IEEE 802.11 OFDM PHY standard, and wherein, the diversity switch is manipulated during attempts to communicate with a proximate wireless local area network so data networking is supported in real-time.

8. A network node as recited in claim 7, wherein the PHY radio receiver is substantially integrated as a single analog chip and a single digital chip.

9. A physical-layer (PHY) radio transmitter for supporting wireless local area network (WLAN) communications according to an IEEE 802.11 PHY standard, the PHY ratio transmitter comprising:
  at least two transmitting antennas connected through a diversity switch to a radio transmitter and providing for selectable diversity transmission points;
  one or more local oscillators;
  a digital processor to generate a digital OFDM signal for transmitting, the digital processor including a processor implementing an inverse Fourier transform operation, the digital processor further including a programmable processor;
  one or more local oscillators;
  a digital-to-analog converter coupled to the digital processor to convert the digital OFDM signal for transmitting to an analog signal;
  a first upconverter coupled to one of the local oscillators and to the digital-to-analog converter, and configured in operation to convert the analog signal to an intermediate frequency signal,
  a filter to filter the intermediate frequency signal to produce a filtered intermediate frequency signal; and
  a second upconverter coupled to one of the local oscillators and configured in operation to convert the filtered intermediate frequency signal to form a radiofrequency signal;
  wherein the diversity switch precedes both transmitting antennas and provides diversity selection between wireless local area network (WLAN) signals output by the antennas, the diversity switch having a switch signal input and a signal between the switch signal input and the digital processor, wherein the PHY radio receiver is configured for operation using OFDM according to an IEEE 802.11 OFDM PHY standard, and wherein, the diversity switch is manipulated during attempts to communicate with a proximate wireless local area network so data networking is supported in real-time.

10. A network node as recited in claim 9, wherein the PHY radio transmitter is substantially integrated as a single analog chip and a single digital chip.

11. A network node for operating in a wireless computer-data network that operates according to an IEEE 802.11 standard, that includes a local network client, and that operates according to an IEEE 802.11 PHY standard, the network node comprising:
  physical-layer (PHY) radio receiver means for supporting communications from the wireless computer-data network to said local network client, the radio receiver means configured for operation using OFDM according to an IEEE 802.11 OFDM PHY standard and including:
    one or more means for producing a local oscillator signal;
    first means for downconverting coupled to one of the means for producing a local oscillator signal and configured in operation to convert a received signal to an intermediate frequency signal;
    means for filtering the intermediate frequency signal to produce a filtered intermediate frequency signal;
    second means for downconverting coupled to one of the means for producing a local oscillator signal and configured in operation to convert the filtered intermediate frequency signal to form a signal for digitizing;
    means for digitizing the signal for digitizing; and
    means for digital processing the digitized signal output by the means for digitizing, the means for digital processing including means for implementing a discrete Fourier transform operation, the means for digital processing further including programmable processing means; and
  at least two receiver antennas connected through means for switching to the PHY radio receiver means and providing for alternative diversity reception points that are selectable according to a switch signal determined by the means for digital processing according to radio signal quality, the means for switching having a signal path for the switch signal from the digital processor of the PHY radio receiver.

12. A network node as recited in claim 11, wherein the PHY radio receiver means is substantially integrated as a single analog chip and a single digital chip.

13. A network node for operating in a wireless computer-data network that operates according to an IEEE 802.11 standard, that includes a local network client, and that operates according to an IEEE 802.11 PHY standard, the network node comprising:
  physical-layer (PHY) radio transmitter means for supporting communications from said local network client to the wireless computer-data network, the radio transmitting means configured for operation using OFDM according to the IEEE 802.11 OFDM PHY standard and including:
    means for digital processing for generating a digital OFDM signal for transmitting, the digital processing means including means for implementing an inverse Fourier transform operation, the means for digital processing further including programmable processing means;
    one or more means for producing a local oscillator signal;
    means for converting of the digital OFDM signal for transmitting to an analog signal for transmitting;
    first means for upconverting coupled to one of the means for producing a local oscillator signal and configured in operation to convert the analog signal for transmitting to an intermediate frequency signal;
    means for filtering the intermediate frequency signal to produce a filtered intermediate frequency signal; and
    second means for upconverting coupled to one of the means for producing a local oscillator signal and configured in operation to convert the filtered intermediate frequency signal to form a radiofrequency signal; and
  at least two transmitter antennas connected through a diversity switch to the PHY radio transmitter means and providing for alternative diversity transmission points that are selectable according to a switch signal determined by means for digital processing according to network responses, the diversity switch having a signal path for the switch signal from the means for digital processing.

14. A network node as recited in claim 13, wherein the PHY radio transmitter means is substantially integrated as a single analog chip and a single digital chip.

15. A network node for operating in a wireless computer-data network that operates according to an IEEE 802.11 standard, that includes a local network client, and that operates according to an IEEE 802.11 PHY standard, the network node comprising:

physical-layer (PHY) radio transmitter means for supporting communications from said local network client to the wireless computer-data network, the radio transmitting means configured for operation using OFDM according to the IEEE 802.11 OFDM PHY standard and including:

means for digital processing for generating a digital OFDM signal for transmitting, the digital processing means including means for implementing an inverse Fourier transform operation, the means for digital processing further including programmable processing means;

one or more means for producing a local oscillator signal;

means for converting of the digital OFDM signal for transmitting to an analog signal for transmitting;

first means for upconverting coupled to one of the means for producing a local oscillator signal and configured in operation to convert the analog signal for transmitting to an intermediate frequency signal;

means for filtering the intermediate frequency signal to produce a filtered intermediate frequency signal; and second means for upconverting coupled to one of the means for producing a local oscillator signal and configured in operation to convert the filtered intermediate frequency signal to form a radiofrequency signal;

physical-layer (PHY) radio receiver means for supporting communications from the wireless computer-data network to said local network client, the radio receiver means configured for operation using OFDM according to the IEEE 802.11 OFDM PHY standard and including:

first means for downconverting coupled to one of the means for producing a local oscillator signal and configured in operation to convert a received signal to an intermediate frequency received signal;

means for filtering the intermediate frequency received signal to produce a filtered intermediate frequency received signal;

second means for downconverting coupled to one of the means for producing a local oscillator signal and configured in operation to convert the filtered intermediate frequency received signal to form a signal for digitizing;

means for digitizing the signal for digitizing to form a digitized signal, coupled to the means for digital processing such that the means for digital processing is configured to process the digitized signal, the means for digital processing including means for implementing a discrete Fourier transform operation;

at least two receiver antennas connected through means for switching to the PHY radio receiver means and providing for alternative diversity reception points that are selectable according to a switch signal determined by the means for digital processing according to radio signal quality, the means for switching having a signal path for the switch signal from the digital processor of the PHY radio receiver; and at least two transmitter antennas connected through a diversity switch to the PHY radio transmitter means and providing for alternative diversity transmission points that are selectable according to a switch signal determined by means for digital processing according to network responses, the diversity switch having a signal path for the switch signal from the means for digital processing.

16. A network node as recited in claim 15, wherein the wherein the PHY radio transmitter means and PHY radio receiver means are substantially integrated together as a single analog transceiver chip and a single digital transceiver chip.

17. A means for physical-layer (PHY) radio reception for supporting wireless local area network (WLAN) communications conforming to one of the IEEE 802.11 OFDM standards, the radio reception means comprising:

means for connecting at least two receiver antennas through a diversity switch to an OFDM radio receiver and providing for selectable diversity reception points, the OFDM radio receiver including:

one or more means for producing a local oscillator signal;

first means for downconverting coupled to one of the means for producing a local oscillator signal and configured in operation to convert a received signal to an intermediate frequency signal;

means for filtering the intermediate frequency signal to produce a filtered intermediate frequency signal;

second means for downconverting coupled to one of the means for producing a local oscillator signal and configured in operation to convert the filtered intermediate frequency signal to form a signal for digitizing;

means for digitizing the signal for digitizing; and means for digital processing the digitized signal output by the means for digitizing, the means for digital processing including means for implementing a discrete Fourier transform operation, the means for digital processing further including programmable processing means;

means for integrating a low-noise amplifier (LNA) with each of the receiver antennas; and means for diversity switching that follows each antenna and corresponding LNA and that provides diversity selection between wireless local area network (WLAN) signals received by the antennas, wherein, the means for diversity switching is manipulated during attempts to communicate with a proximate wireless local area network so data networking is supported in real-time.

18. A means for physical-layer (PHY) radio transmitting that supports wireless local area network (WLAN) communications conforming to one of the IEEE 802.11 OFDM standards, the radio transmitting means comprising:

means for connecting at least two transmitting antennas through a diversity switch to an OFDM radio transmitter and providing for selectable diversity transmission points, the radio transmitter including:

means for digital processing for generating a digital OFDM signal for transmitting, the digital processing means including means for implementing an inverse Fourier transform operation, the means for digital processing further including programmable processing means;
one or more means for producing a local oscillator signal;
means for converting of the digital OFDM signal for transmitting to an analog signal for transmitting;
first means for upconverting coupled to one of the means for producing a local oscillator signal and configured in operation to convert the analog signal for transmitting to an intermediate frequency signal;
means for filtering the intermediate frequency signal to produce a filtered intermediate frequency signal; and
second means for upconverting coupled to one of the means for producing a local oscillator signal and configured in operation to convert the filtered intermediate frequency signal to form a radiofrequency signal; and
means for diversity switching that precedes both transmitting antennas and that provides diversity selection between wireless local area network (WLAN) signals output by the antennas, wherein, the means for diversity switching is manipulated during attempts to communicate with a proximate wireless local area network so data networking is supported in real-time.

* * * * *